United States Patent

[11] 3,563,313

[72] Inventor Lloyd B. Spangle
 Tulsa, Okla.
[21] Appl. No. 859,223
[22] Filed July 25, 1969
[45] Patented Feb. 16, 1971
[73] Assignee The Dow Chemical Company
 Midland, Mich.
 a corporation of Delaware
 Continuation-in-part of application Ser. No.
 749,683, Aug. 2, 1968, now abandoned,
 which is a continuation-in-part of Ser. No.
 701,994, Jan. 31, 1968, abandoned.

[54] WELL CEMENTING METHOD USING QUICK GELLING CEMENT
 3 Claims, 9 Drawing Figs.

[52] U.S. Cl. .................................................. 166/292
[51] Int. Cl. ........................................... E21b 33/138
[50] Field of Search .......................................... 166/285,
 292, 293; 106/89, 97, 100, 103, 104, 109

[56] References Cited
UNITED STATES PATENTS

| | | | |
|---|---|---|---|
| 1,923,370 | 8/1933 | Hansen .......................... | 106/89 |
| 2,846,327 | 8/1958 | Wood et al. .................. | 106/97 |
| 2,918,385 | 12/1959 | Arpin et al. ................... | 106/97 |
| 3,155,526 | 11/1964 | Klein ............................. | 106/89 |
| 3,232,778 | 2/1966 | Dean ............................. | 106/97 |
| 3,411,924 | 11/1968 | Lapshin ........................ | 106/89 |

Primary Examiner—Stephen J. Novosad
Attorney—Griswold and Burdick and Charles W. Carlin and Bruce M. Kanuch ABSTRACT: An improved hydraulic cement composition comprising critical proportions of $CaSO_4 \cdot 1/2H_2O$ and Portland cement, substantially free of kaolin, bentonite or other clay materials and balance water, which provides a slurry of initially low viscosity but having an accelerated rate of gelation and the method of use of such composition in underground cementing operations, most especially in such operations known as multistage well cementing.

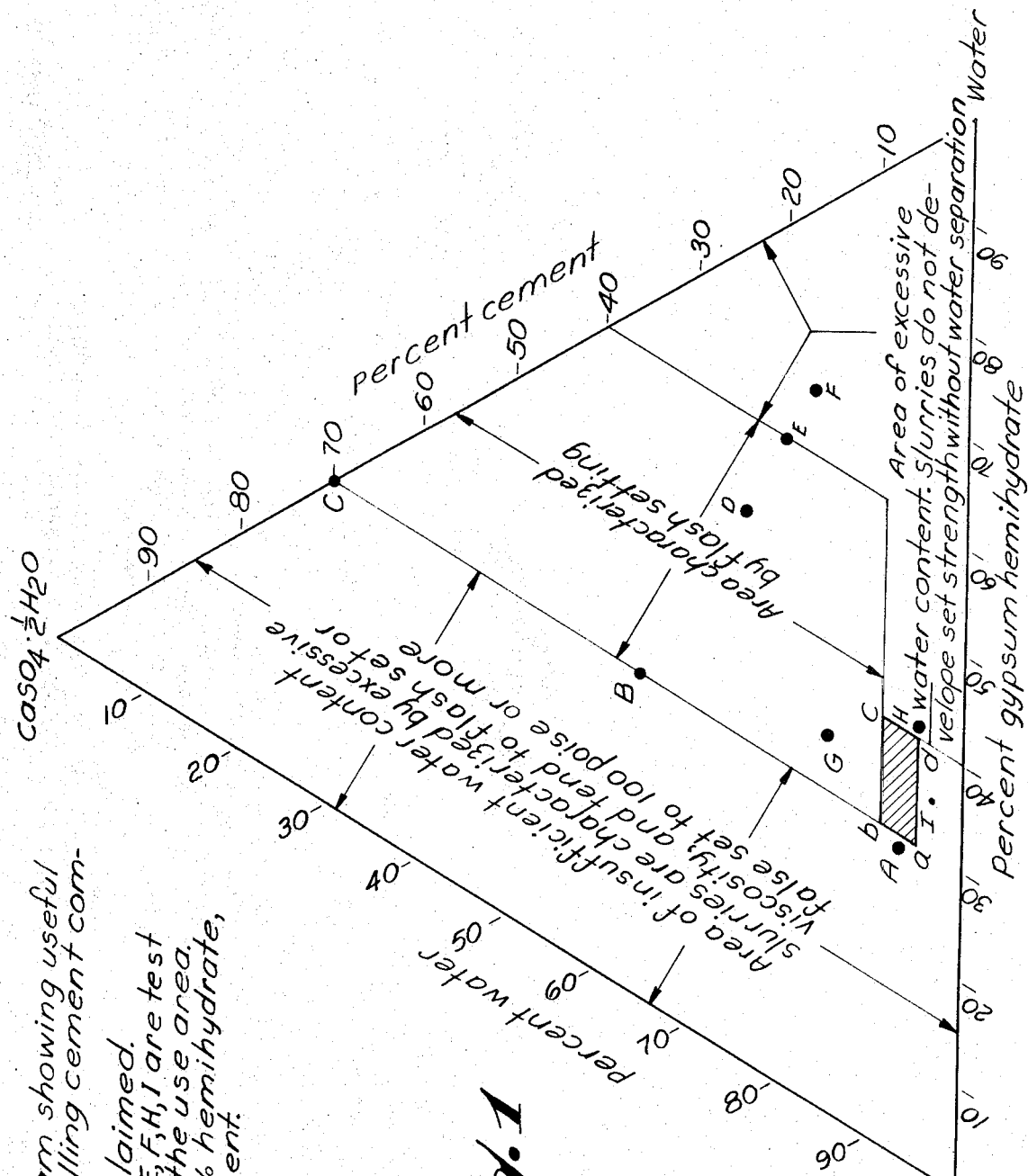

WELL CEMENTING METHOD USING QUICK GELLING CEMENT

This application is a continuation-in-part of application Ser. No. 749,683, filed Aug. 2, 1968, now abandoned, which was a continuation-in-part of application Ser. No. 701,994, filed Jan. 31, 1968, now abandoned.

The invention pertains to hydraulic cements and particularly to an improved cement which provides a relatively thin, highly fluid slurry in water and which gels in a desirably short time, thereby becoming self-supporting and capable of supporting heavy fluids resting on it, very quickly after its emplacement, thus lessening pressure on confining walls.

Conventional hydraulic cement slurries are very heavy (i.e. of relatively high density) and attain little self-support until a lapse of a relatively long time, often hours after emplacement. If the high density is sought to be corrected by increasing the ratio of water to cement solids, the setting rate is undesirably lengthened, and usually the compressive strength of the cement, when set, is objectionably reduced.

The problems associated with the undesirable properties of conventional hydraulic cement slurries have been particularly challenging and sometimes baffling in oil, gas, and water well cementing operations.

A further problem associated with well cementing operations results from damage done by the high hydraulic pressure of the cement slurries (1) often causing formation damage as when the formation is fractured and cement slurries follow the fractures, subsequently thereby plugging off portions of the reservoir and (2) sometimes rupturing the casing.

Attempts have been made to solve these problems. In U.S. Pat. No. 2,846,327, there is described a cement composition requiring gypsum, Portland cement, bentonite, and water. It is of lighter weight than conventional aqueous cement slurries. This composition of said patent, however, requires, by volume of cement, the presence of at least 33 percent of gypsum and at least 2 percent of bentonite by volume. The aqueous cement slurry of this patent has a relatively high viscosity and a relatively long gel time, both of which are quite undesirable in a great many instances, particularly in oil well cementing.

A need exists for an improved hydraulic cement for use in slurries which have low initial viscosity properties and which gel and set in a very short time, after being emplaced, to a strong unitary solid. There is a special need for a cement for preparing aqueous slurries which are acceptable for use in deep wells since such use, employing conventional cement slurries, produces a high hydrostatic head. Such slurry, however, must not sacrifice good ultimate strength properties. It is especially important that the emplaced cement slurry, when set, provide adequate shutoff of water and brine intrusions.

The invention meets this and associated needs by providing such improved cement and method of use in underground geologic formations, particularly in relation to wells penetrating water, gas, or oil-bearing formations.

The invention comprises a mixture of (1) calcium sulfate hemihydrate (2) Portland cement, in specified proportions, and water to make 100 percent. The mixture is used in the practice of the invention by admixing the cement and $CaSO_4 \cdot 1/2H_2O$ with water (which admits of usual dissolved solids present in well water or tap water) in proportions of between about 30 and about 40 percent of the cement $CaSO_4 \cdot 1/2H_2O$ mixture, by dry weight. Each of ingredients (1) and (2) can be first mixed with water to make slurries and then the slurries admixed or the ingredients (1) and (2) can be dry mixed and then mixed with water. Portland cement as purchased differs according to class (e.g. Class A to H of the API classification and also differs within a class dependent upon the manufacturer). The proportions of hemihydrate, Portland cement, and water are highly critical and vary with each particular brand of cement in the preparation of the slurry. Since the composition of the invention is dependent on the principal chemical and physical composition of the set cement used, each brand and type of cement is tested to determine the optimum concentrations, within the specified proportions, of hemihydrate and water (to compensate for variations in properties of the dry cement). If desired, commonly known additives such as retardants, accelerators, friction-loss or turbulence inducers, and fluid-loss control compositions may be used in accordance with the area of well cementing. For example, it is sometimes preferred to admix a small but effective amount of $CaCl_2$ with the composition as an accelerator to setting. The judicious use of $CaCl_2$ when low temperature (below 100° F.) prevail also prevents excessive delayed expansion.

Reference to FIG. 1 of the drawing, a three-phase diagram, is suggested to ascertain the proportions to use.

FIGS. 2 to 9 of the drawing illustrate the multistage cementing method of the invention and the device which greatly facilitates such method.

The $CaSO_4 \cdot 1/2H_2O$ used herein has a solubility in water at 100° C. of at least about 0.15 gram/100 grams of water with increasing solubility in colder water.

The term Portland cement, as used herein, includes the usual pulverized calcareous-argillaceous sintered clinkers and such cement containing some fly ash cinders and the like, as well as high aluminum cements and cements containing some sulfoaluminate cement, known generally as expansive cements, e.g. as described in the Klein U.S. Pat. Nos. 3,303,037; 3,155,526; and 3,251,701.

Among the advantages of using the cement in accordance with the practice of the invention are: (1) it decreases the need when cementing in stages for such mechanical devices as baskets or complicated stage collars; (2) it lessens slurry loss to weak or highly permeable zones and lessens formation damage; (3) the amount of fill-up cement slurry necessary is more nearly accurately predictable; (4) there is substantially no water separation in the slurry during the setting period; (5) the slurry is highly resistant to the invasion of mud and, accordingly, from contamination thereby and also from dilution or cutting by intruding water or brine.

The cement of the invention has the specific property of thixotropy, which manifests itself by being thin, i.e. being of low viscosity, when freshly prepared and injected, but of gelling to a firm state shortly after it has been injected and has been injected and has been allowed to remain substantially undisturbed. It allows the unset but gelled column of cement which has been injected into an annulus between a casing and the wellbore wall to become self-supporting very quickly and accordingly the column exerts little hydrostatic pressure. The method of the invention is a simplified multiple-stage operation but meeting all the needs for such operation and greatly facilitated in practice by an improved stage device.

The improved hydraulic cement of the invention provides a means for lessening the fall-back or pressures exerted on the bottom and walls of a confining space, e.g., casing, due to the hydrostatic pressure of the cement slurry. The practice of the invention lessens this because the internal frictional forces of the cement of the invention, existing within the cement slurry of the invention, give it structural strength and thereby effectively reduce the hydrostatic head of the cement column and lessen the likelihood of a breakdown of the formation due thereto. Even though some small amount of the cement slurry injected according to the invention does enter the formation, its progress quickly ceases because the slurry gels almost immediately as it enters the formation and thus prevents further entrance of the slurry.

In the drawing:

FIG. 1 shows the weight proportions of the required ingredients of the slurry of the composition of the invention.

Figure 5:
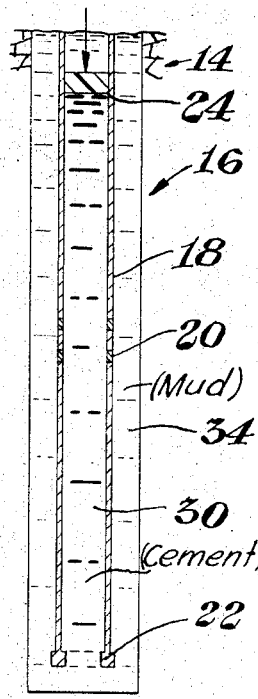
FIGS. 5 to 9 represent elevational views of a cased wellbore showing successive stages of treatment according to the invention.
Figure 6:
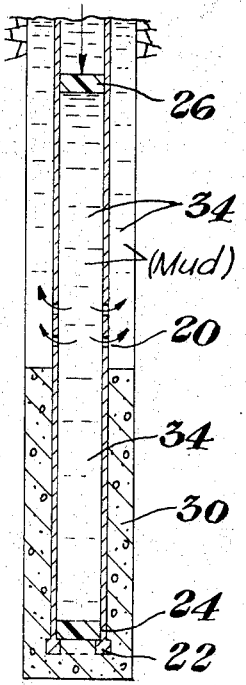

FIG. 1 of the drawing shows values of each of three essential ingredients.

The hatched area represents the area of operation within the invention and designates the weight percentages of ingredients to use. The values in amounts of each to make 100 percent are:

CaSO$_4$ 1/2H$_2$O about 5 percent to 9 percent
Portland cement about 51 percent to 65 percent
Water about 30 percent to 40 percent Judicious variations of proportions within the shaded area, for best results, is readily ascertainable by those skilled in the art.

The use of more than 9 percent of the hemihydrate even with the specified amounts of water and cement, is characterized by an insufficiently controllably fast (flash) setting and its use is not generally practical. The use of less than 5 percent hemihydrate is characterized by a low gel strength.

Figure 3:
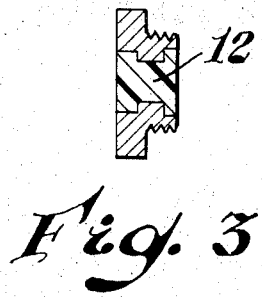
FIGS. 3 and 4 are schematic views of a threaded pressure-sensitive blowout plug for screwing into perforations 10.
Figure 4:
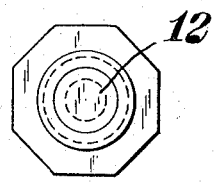
Figure 2:
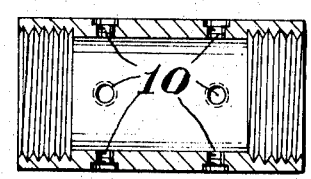
FIG. 2 is a schematic side view of an inserted casing nipple (hereinafter called perforated section) to be threadedly engaged to ends of casing sections and which is provided with threaded perforations 10.

In FIGS. 2 to 4 of the drawing, threaded perforations in the thread-bearing insert section are item 10 and the frangible disc portion of the blowout plug is item 12.

In FIGS. 5 to 9, the various features thereof are represented as follows: geologic formation 14 is penetrated by wellbore 16 provided with customary casing sections 18 and perforated sections of the invention 20 all threadedly engaged; guide shoe 22; cement slurry wiper plugs 24, 26 and 28; successive cement injections are items 30 and 32; displacing aqueous mud slurry is item 34.

As expressed in the explanatory statements on FIG. 1, the use of less than about 30 percent water defines an area of undesirably high viscosity and usually of false set, which means that it only appears to set but in reality has not set and therefore is not a true set.

As further expressed in FIG. 1, excessive water in the slurry results in unacceptable final set strength without the accompaniment of undesirable water separation.

Also, as shown and set out in FIG. 1, flash setting occurs when more than 51 percent cement more than 40 percent or less than 30 percent water is employed. It shows that unacceptably low gel strength characterizes the set composition when less than 5 percent CaSO$_4$ 1/2H$_2$O is employed.

Tests employing proportions falling outside the limits of the invention designated by A, B, C, D, E, F, G in FIG. 1 are for comparative purposes.

The following series of examples are illustrative of the practice of the invention:

SERIES ONE

Tests 1 to 5

Portland cement was admixed with CaSO$_4$ 1/2H$_2$O and CaCl$_2$ (the latter optionally employed as an accelerator to set) in the dry state, and the resulting dry mixture admixed with water in the amounts shown in Table I below.

The density, weight, thickening time, gel strength after both 30 seconds and after 60 seconds at the temperature desired, and the compressive strength are shown in the table. Each of the tests was conducted according to API RP 13B (1962) for determining values of drilling fluids, and API RP 10B (1967) for testing oil well cements.

CaCl$_2$ and at varying temperatures, are within the specified ranges that are fully satisfactory for use in cementing operations in geologic formations.

SERIES TWO

Tests 6 to 10

The tests constituting this series were conducted to demonstrate the reduced hydrostatic head of an aqueous cement composition prepared according to the invention. The mixing procedure was that followed in Example 1, i.e., the dry materials were first mixed together and thereafter the resulting mixture was admixed with water. The proportions of the ingredients in percent by weight are shown in Table II, infra. The density of each of the slurries 6 to 10 was 14.9 pounds per gallon. Significant properties of the compositions so prepared were obtained and are set out in API RP 13B. The slurry used in the test identified by numbers 6 to 9 were not in accordance with the invention and are presented for comparative purposes. The slurry used in test number 10 is illustrative of the practice of the invention.

The test apparatus for determining the resultant downward force exerted on the bottom of the volume of fluid being tested, to measure hydrostatic head for Tests 6 to 10 hereof (which also indirectly measures the extent of self-support exhibited by the fluid) or force at the bottom of a column thereof, was conceived and designed by me and applied to this particular need.

The test equipment consists essentially of a 1½inch diameter, 13 inches long open-ended tube, preferably of Plexiglass or similar transparent material (i.e. cured resin, glass, or the like) attached by a flexible diaphragm, such as rubber, horizontally secured by a suitable retainer ring at a short distance above the bottom of the Table and clamped in a stationary position. The lower end of the tube rests on a base plate provided with a flexible seal to prevent leakage. The plate and lower end of the tube are enclosed with a plastic envelope open at the top. The base plate rests on the top of an attached vertically positioned coil spring, to which is attached a pointer arm terminating on a vertical scale which is graduated so that pounds of pressure exerted on the top of the coil spring are converted directly to and read in pounds. The greater the amount by which the spring is compressed by force necessary to retain the contents of the tube, the higher the reading in pounds on the scale.

The apparatus is calibrated as follows:

The space below the diaphragm is filled with water and placed on the spring-supported table. The tube is then clamped securely in place. The spring force on the table is used to retain the water under the diaphragm and is reduced until the water begins to leak from the base of the tube. At this point, the indicator will show a scale reading of zero pounds force. This procedure is repeated with the exception of using varied density liquids in the tube space above the diaphragm. Utilizing this procedure, the accurate force-indicating scale

TABLE I

| Test No. | Composition of slurry | | | | | Actual slurry wt., lb./cu. ft. | Thickening time in hrs. and minutes | Gel strength, lb./ 100 square ft. after— | | Compressive strength in p.s.i. |
| | Portland cement | | CaSO$_4$ hemihydrate, percent | CaCl$_2$, percent | Water, percent | | | | | |
| | Type | Percent | | | | | | 30 sec. | 60 sec. | |
| --- | --- | --- | --- | --- | --- | --- | --- | --- | --- | --- |
| 1 | A | 58.5 | 7.0 | 1.8 | 32.7 | 15.1 | 2:10 | 40 | 120 | 900 after 16 hrs. at 90° F. |
| 2 | A | 55.6 | 6.7 | 0.5 | 37.2 | 14.45 | 1:09 | 40 | 95 | 1,085 after 10 hrs. at 120° F. |
| 3 | A | 55.9 | 5.5 | 1.7 | 36.9 | 14.47 | 2:00 | 90 | 190 | 281 after 16 hrs. at 80° F. |
| 4 | C | 55.2 | 6.7 | 0.5 | 37.6 | 14.4 | 1:10 | 30 | 50 | 650 after 12 hrs. at 70° F. |
| 5 | E | 57.1 | 6.8 | 1.7 | 34.4 | 14.9 | 2:52 | | | 194 after 6 hrs. at 80° F. |

NOTES:
The ratios of Portland cement, CaSO$_4$ hemihydrate, and water of tests 1 to 5 fall within the horizontally hatched area of the three-phase diagram of the drawing.
The points on the diagram are based on 100% of the three designated components; the CaCl$_2$ was calculated as a percent of the three-component mix. Accordingly, the points on the diagram are first located without reference to the samll percent of CaCl$_2$ which was calculated as a percent by dry weight of the Portland cement present.

Reference to Table I shows that the thickening time, gel strength, and compressive strength of the cement composition of the invention, containing varying amounts of optional can be obtained. The heavier the liquid in the tube above the diaphragm, the more compressive force is required of the spring to retain the water below the diaphragm.

The following test illustrates the use of the testing apparatus. The calibration curve is drawn employing as points those attained by the above-described calibration procedure. The curve will have as its coordinator the scale units and the pressure on the base plate in p.s.i. per foot of a depth of liquid in the tube. The tube was filled with a 14.9 pound per gallon uniformly mixed slurry consisting of 800 grams of Portland and 200 grams of silica flour admixed in 552 milliliters of water. The tube was filled to overflowing and the necessary adjustment was then made until water appeared below the rubber diaphragm in the lower portion of the tube. A reading was taken at that time which indicated that the slurry was resting its ultimate full weight on the base plate. The reading was 32.5.

The slurry was removed from the tube and a second 14.9 pound per gallon slurry poured into it. The slurry consisted essentially of 600 grams of Portland cement and 400 grams of pozzolan cement in 394 milliliters of water. A reading of 30 was obtained showing that the cement slurry was partially self-supporting. The pressure on the base plate was only that which would normally be exerted by a nongelling liquid having a density of only 11.4 pounds per gallon.

The slurry was removed and a third slurry placed therein. This slurry consisted of 800 grams of Portland cement, 96 grams of $CaSO_4 \cdot 1/2H_2O$, and 24 grams of $CaCl_2$ in 480 milliliters of water. The reading of the instrument was 25, showing that the cement composition has excellent gel strength and exerted a pressure on the base plate equivalent only to that which would have been exerted by a nongelling liquid having a density of only 7.6 pounds per gallon.

EXAMPLE 11

This example of the invention illustrates the common single stage cementing job, of the type usually performed in nonexceptional situations, employing the composition of the invention.

A 6½- inch diameter hole, of a depth of 3,365 feet, was cased to bottom with a 4½- inch diameter casing which had a guide shoe at 3,364 feet and a float collar at 3,358 feet. Seven centralizers were used.

The cement slurry was prepared, consisting of 52.5 parts Portland cement, 6.3 parts $CaSO_4$ $1/2H_2O$, 1.5 parts $CaCl_2$, 0.05 part vesiculated polystyrene fragmented to a size such that the greatest dimension was between one thirty-second inch and three-eighths inch (as a fluid-loss control agent, as claimed in claim 1 of U.S. Pat. No. 2,502,191), and 39.65 parts water, and injected down the casing and forced into the lower part of the annulus between the casing and the borehole wall. The weight of the slurry was 14.8 pounds per gallon. 106 cubic feet of slurry were injected into the annulus.

The cement quickly acquired an initial gel strength after emplacement. As a result thereof, it was substantially self-supporting and exerted a reduced force on the formation and therefore caused no formation breakdown.

Before treatment, this gas well did not produce enough gas to register on a measuring gauge. Following this successful cementing treatment and after selective perforation of the cement column, the well was blown to the atmosphere for 3 days. The well was thereafter tested and found to produce 140 million cubic feet of gas per day.

TABLE II

| | Composition of slurry | | | | | | |
|---|---|---|---|---|---|---|---|
| Test No. | Portland cement | $CaSO_4 \cdot 1/2H_2O$ | Hydroxy-ethyl cellulose | 325 mesh silica flour | $CaCl_2$ | Fly ash cement | Water |
| 6 | 64.67 | | | | | | 35.33 |
| 7 | 49.00 | | | 17.2 | | | 33.8 |
| 8 | 43.00 | | | | | 28.70 | 28.30 |
| 9 | 63.85 | | 1.28 | | | | 34.87 |
| 10 | 57.10 | 6.80 | | | 1.80 | | 34.30 |

TABLE III

| Test No. | Apparent viscosity in cps. 600 r.p.m. reading plus 2 | Plastic viscosity in cps. 600 reading less 300 reading | Yield point in pounds/100 sq. ft. 300 reading-apparent reading at 3 r.p.m. | Gel strength in pounds per 100 sq. ft. after 30 seconds | Resultant force at bottom of column |
|---|---|---|---|---|---|
| 6 | 37.5 | 32 | 11 | 7 | 15 |
| 7 | 46.0 | 36 | 20 | 9 | 14.4 |
| 8 | 300 | 220 | 160 | 15 | 11.4 |
| 9 | 763 | 440 | 645 | 45 | 14.9 |
| 10 | 212 | 125 | 175 | 20 | 7.6 |

Reference to Tables II and III shows that, although the apparent and plastic viscosity, the yield point, and the gel strength of compositions prepared for Test 6 to 9 varied both above and below test slurry 10 (illustrative of the invention), the resulting weight or total force exerted at the bottom of the column by compositions of Test 6 to 9 was too great to attain the objectives of the invention, viz. to be self-supporting to a sufficient extent immediately after emplacement to reduce definitely the force against the bottom thereof. The results of Test 10. on the other hand, showed a marked reduction in the force exerted at the bottom of the column.

Table III also shows that from 6 to 10 parts of the $CaSO_4$ *$1/2H_2O$ component and up to 3 parts of calcium chloride when desired (for more rapid setting), if mixed with sufficient water to render the slurry pumpable, produces a satisfactory slurry for the practice of the invention.

The following examples illustrates a field cementing job employing the composition of the invention in a single stage type well cementing job.

EXAMPLE 12

This example illustrates the method of the invention employing the novel composition of the invention in a multistage well cementing operation employing the novel apparatus of the invention adapted for use with such composition in such method. Reference to FIGS. 2 to 9 of the drawing is helpful in following this example of the invention.

A wellbore penetrating a fluid-producing zone in a formation has just been drilled. Casing is to be emplaced to the desired depth. The well is deep and extends into strata that are relatively easily fractured. It is desired that the well be cemented in stages to avoid formation damage. The distance from the bottom of the well to the lowest of the levels, that where the first cement slurry injection will occur, is ascertained and the volume of the corresponding vertical sections of the annulus between the casing and the formation wall are calculated.

Casing comprising conventional sections 18 is then run down to the desired depth having threaded and thus positioned between the sections special perforated sections, as illustrated by FIG. 2 of the drawing, which are thus located at the points of cement slurry injection from the casing into the annulus between casing and formation wall.

A perforated section (FIG. 2) (which is relatively short, usually being between 1 and 6 feet long), is perforated with from one to eight (usually two to four) perforations 10, either at random or at spaced intervals in the circumferential surface of the section and the perforations so made threaded (i.e., tapped) to constitute perforations 10.

Blowout plugs having the appearance of FIGS. 3 and 4 of the drawing were previously made. They comprise a threaded insert plug which has a rupturable or frangible diaphragm 12 over the central portion thereof which is made of a material having a predetermined rupture or strain value in pounds per square inch. The diaphragm may be made of thin metal, nylon, or Teflon or the like having known rupture strength. The blowout plugs are screwed into the threaded holes in the perforated sections which in turn are engaged between casing sections 18 and lowered into the wellbore thereby causing the blowout plugs to be spotted at levels where cement injections are to be made through the casing. Preferably at least one of these levels is selected to be at a producing interval in the formation.

If more than two stages of cementing are desired, additional perforated sections containing the blowout plugs are threadedly engaged between casing sections 18 and located at each desired level.

At the time that the casing string is run into the well, the borehole, and consequently, the annulus also, are full of a liquid, e.g., drilling mud 34. The bottom section of the casing, positioned in the well, is usually provided with a guide shoe (represented by item 22) which not only serves its usual purpose of guiding the casing down the well but thereafter serves as a locking means for a first subsequently inserted cementing wiper plug designated 24. The lower end of the bottom casing section is provided with members which hold the wiper plug firmly in place when it has been forced to that depth. All wiper plugs are of a material that can subsequently be drilled out or otherwise removed prior to putting the well in production.

Having the casing, wherein sections thereof have the above described perforated sections containing blowout plugs therein, and provided with the guide shoe in place, an optional leading wiper plug (not shown) which will pass easily through guide shoe 22, is advisedly started down the casing, forcing mud ahead of it and being followed by the first of the series of cement slurries (designated 30) to be used in the multistage job. The first injection consists essentially of a predetermined amount of a slurry prepared similarly to one of the best performing compositions of Table I or Test 10 of Table II, the amount of slurry pumped down the wellbore being in a calculated amount to equal substantially the volume in the annulus between the bottom of the wellbore and the lowest perforated section containing the blowout plugs and also a sufficient excess thereof to fill the wellbore and casing from the bottom of the wellbore to a short distance above the bottom of the lowest blowout plug.

FIG. 5 shows the first injection 30 of cement slurry in the casing. Mud 34 remains in the annulus.

The first injection of cement slurry is followed by a wiper plug identified as 24 in FIGS. 5 to 9. (This plug will lock when it reaches guide shoe 22.) It is displaced downwardly by a second quantity of displacing liquid (usually also drilling mud 34) until plug 24 reaches the bottom of the casing and is there locked by the guide shoe containing the locking means. In the absence of such locking guide shoe, it can be held there by controlled hydrostatic pressure. The cementing operation then is of the status diagrammatically shown in FIG. 6 of the drawing.

Figure 7:
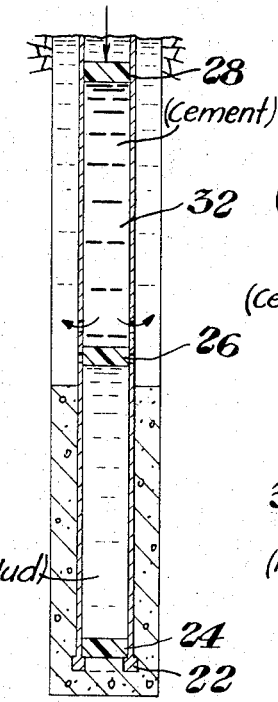
Figure 8:
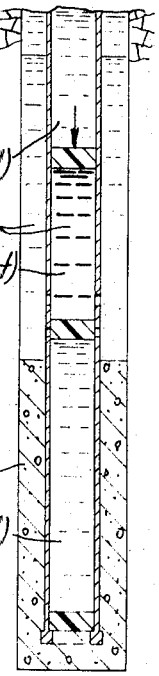
Figure 9:
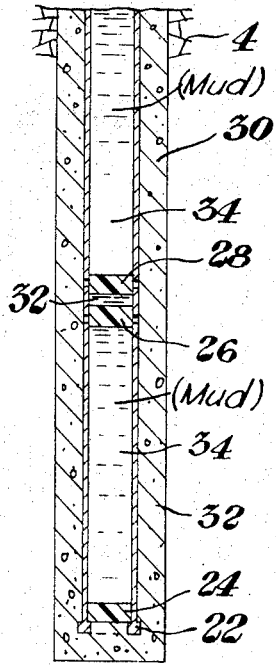

At this time, a second calculated quantity 32 of cement slurry (to fill annulus and wellbore between the two lowest sets of blowout plugs) is pumped down the wellbore followed by wiper plug 26 and additional mud at a pressure sufficiently great to rupture the diaphragms 12 of the lowest set of blowout plugs. The mud in the wellbore above the lowest perforated section containing such blowout plugs is then displaced into the annulus through the so ruptured blowout plugs (and thence upward) as shown in FIG. 7. The second quantity 32 of cement slurry, which is followed by wiper plug 28 and additional mud which forces also this cement slurry 32 out through the ruptured blowout plugs into firm contact with the formation, as shown in FIG. 8 during such displacement, and as in FIG. 9 after substantially complete displacement of this second quantity of cement.

Wiper plugs 24 to 28 may thereafter be conveniently drilled out and the mud circulated out of the wellbore prior to putting the well into production.

Example 12 shows the practice of the method of the invention employing the improved blowout plugs positioned in the threaded perforated sections. A most valuable advantage of the practice of the invention, as shown in Example 12 and as illustrated by FIGS. 5 to 9, is the marked time saving because the steps may be followed in rapid order without sacrifice of any final desired effects of a multistage cementing job.

I claim:

1. The method of cementing in a subterranean formation which comprises emplacing, in contact with the formation, the hydraulic cement composition which has improved gelation qualities which quickly acquires self-supporting properties comprising, by weight:
    a. between about 5 percent to 9 percent of $CaSO_4$ $1/2H_2O$,
    b. between about 51 percent to 65 percent Portland, aluminous, pozzolan, calcium sulfoaluminate cement, or mixtures thereof; and
    c. balance substantially water or brine to make a total of 100 percent, and allowing the composition so emplaced to remain substantially undisturbed, whereby it sets to a unitary solid.

2. The method of cementing in a subterranean formation penetrated by a wellbore, containing conventional fluid mud, to be provided with a casing wherein a multistage cementing job is desired to be performed comprising displacing mud out of the wellbore, as the following steps are performed:
    1. locating at the formation interval, in the casing, at the level where cementing is to be performed, at least one section containing at least one pressure-sensitive frangible plug;
    2. injecting down the casing and into the lower part of the annulus between the casing and formation wall a first quantity of a settable aqueous hydraulic cement composition which has improved gelation qualities and which quickly acquired self-supporting properties comprising by weight:
        a. between about 5 percent to 9 percent of $CaSO_4$ $1/2H_2O$,
        b. between about 51 percent to 65 percent Portland, aluminous, pozzolan, calcium sulfoaluminate cement or mixtures thereof; and
        c. balance substantially water or brine to make a total of 100 percent;
    said quantity being substantially equal to the volume of the wellbore casing and to extend up to the desired limited height from the wellbore casing and up to the desired height from the well bottom, in the annulus;
    3. forcing a cement wiper plug down the casing following said first quantity of cement composition, said plug seating in the casing at a level not a substantial distance from the bottom thereof;
    4. injecting a second quantity of said aqueous cement composition down the casing to the so seated wiper plug at a pressure sufficiently great to rupture said pressure-sensitive frangible plugs and forcing said second quantity of composition through the resulting rupture in said plug into contact with the formation.

3. The method according to claim 2 wherein a plurality of sections having frangible plugs therein are emplaced at successive vertical intervals in the wellbore in accordance with Step 1 of claim 2 and Steps (2) to (4) of claim 2 are repeated whereby predetermined quantities of said aqueous cement compositions are ejected through the sections of ruptured plugs successively at decreasing depths.

Disclaimer 3,563,313.—*Lloyd B. Spangle*, Tulsa, Okla. WELL CEMENTING METHOD USING QUICK GELLING CEMENT. Patent dated Feb. 16, 1971. Disclaimer filed Aug. 17, 1973, by the assignee, *The Dow Chemical Company*.

Hereby enters this disclaimer to claims 1–3 of said patent.

[*Official Gazette December 25, 1973.*]